R. J. WELLES.
COUNTERSINKS.
No. 170,653. Patented Nov. 30, 1875.
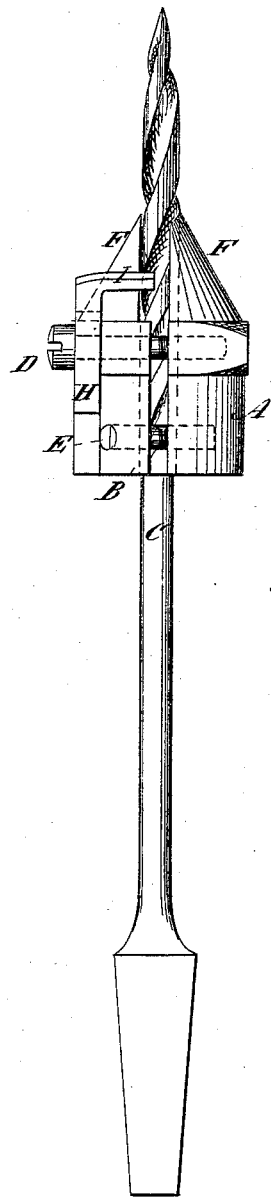
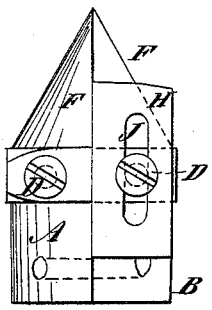
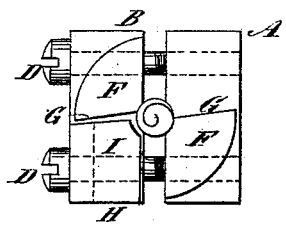
WITNESSES:
INVENTOR:
R. J. Welles
BY
ATTORNEYS.

UNITED STATES PATENT OFFICE.

RICHARD J. WELLES, OF KENOSHA, WISCONSIN.

IMPROVEMENT IN COUNTERSINKS.

Specification forming part of Letters Patent No. 170,653, dated November 30, 1875; application filed September 11, 1875.

*To all whom it may concern:*

Be it known that I, RICHARD J. WELLES, of Kenosha, in the county of Kenosha and State of Wisconsin, have invented an Improvement in Countersinks to Boring-Tools, of which the following is a specification:

The invention will first be described in connection with drawing, and then pointed out in the claim.

Figure 1 is a side elevation of a boring-bit with my improved countersink attachment. Fig. 2 is a side elevation of the attachment without the bit; and Fig. 3 is an end elevation.

Similar letters of reference indicate corresponding parts.

A and B represent the two pieces forming the countersink, said pieces being clamped on the bit-shank C by screws D, and having dowels E to aid the screws in keeping them in position. F represents the cutting points or bits of the countersink. They are in form about a quarter-section of a cone, and arranged with their cutting-edges G parallel to the clamping-screws D, so that they work alike, whether clamped to a large or small shank, C, and ample clearance is provided between the heel of one and the cutting-edge of the other. H is the gage or stop for regulating the depth of the countersink. It is a small bar, with a foot, I, at the lower end, clamped to one of the pieces of the countersink by one of the clamp-screws by which the two pieces are clamped to the bit, the screw passing through a slot, J, in the bar, to allow the latter to be shifted up and down, according to the required depth of the countersink. The pieces A and B are rounded at the upper end, to render the attachment capable of turning on the surface of the stuff without catching and binding on any irregularities thereof, as an angular end would, to enable the contrivance to be used for a stop, to regulate the depth of holes not to be countersunk, by inverting the attachment on the shank of the bit.

I am aware that two sections of a countersink attachment for boring-tools have been held by a yoke, one of whose prongs passed through each part, and was secured by a nut on the threaded end; but

What I claim is—

An improved countersink attachment herein described, clamped to a tool by a set-screw on each side, and passing directly through each part, whereby the shank of the tool is pressed from each side, and the sides drawn firmly together.

RICHARD J. WELLES.

Witnesses:
CHAS. F. BAILEY,
C. SEDGWICK.